(12) United States Patent
Sato

(10) Patent No.: US 9,030,848 B2
(45) Date of Patent: May 12, 2015

(54) DC TO DC CONVERTER

(71) Applicant: Fuji Electric Co., Ltd., Kawasaki-shi (JP)

(72) Inventor: Tadahiko Sato, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 427 days.

(21) Appl. No.: 13/648,328

(22) Filed: Oct. 10, 2012

(65) Prior Publication Data

US 2013/0107582 A1    May 2, 2013

(30) Foreign Application Priority Data

Oct. 26, 2011   (JP) .................................. 2011-234700

(51) Int. Cl.
    *H02M 3/335*         (2006.01)
(52) U.S. Cl.
    CPC .................................. *H02M 3/33592* (2013.01)
(58) Field of Classification Search
    USPC .......... 363/21.06, 21.14, 53, 89, 127
    See application file for complete search history.

(56) References Cited

U.S. PATENT DOCUMENTS 5,841,641 A  *  11/1998  Faulk ......................... 363/21.14
6,026,005 A     2/2000   Abdoulin
2004/0037099 A1  2/2004  Nishikawa
2009/0316441 A1 * 12/2009 Hu .............................. 363/21.06
2011/0075464 A1 *  3/2011 Sato ............................ 363/127
2013/0094252 A1 *  4/2013 Sato ............................ 363/21.11
2013/0107582 A1 *  5/2013 Sato ............................ 363/21.06

FOREIGN PATENT DOCUMENTS

| JP | 04-285477 A | 10/1992 |
| JP | 2006-320094 A | 11/2006 |
| JP | 3991785 B2 | 8/2007 |
| JP | 4094727 B2 | 3/2008 |

* cited by examiner

*Primary Examiner* — Jeffrey Sterrett
(74) *Attorney, Agent, or Firm* — Rossi, Kimms & McDowell LLP

(57) ABSTRACT

A DC to DC converter can include a reverse-blocking semiconductor switch that makes a synchronously rectifying MOSFET become parallel-connected with a capacitor that is connected to a power supply of a controller IC for a conventionally used synchronously rectifying circuit. The reverse-blocking semiconductor switch can be driven either by signals for adjusting a voltage of the capacitor within a permitted range of voltage of the power supply of the controller circuit, or by signals that are determined by a signal obtained from voltage across the MOSFET and the signals for adjusting a voltage of the capacitor within a permitted range of voltage of the power supply of the controller circuit.

20 Claims, 8 Drawing Sheets

DC TO DC CONVERTER

BACKGROUND OF THE INVENTION

1. Field of the Invention

The present invention relates to DC to DC converters that generate a DC voltage by insulated conversion from a DC power supply voltage.

2. Description of the Related Art

FIGS. 8A and 8B show a conventional technology as disclosed in Japanese Patent No. 4094727. The main circuit of the figures composes a forward type DC to DC conversion circuit to supply a load LD with a DC power and includes a transformer Tr having a primary winding n1 and a secondary winding n2, a DC power supply DP and a MOSFET Q1 driving the primary winding n1 to conduct insulated transformation to high frequency voltage, a rectifying MOSFET Q2 and free-wheeling MOSFET Q3 to conduct synchronous rectification of the voltage of the secondary winding n2, and a filter circuit consisting of a reactor L and a capacitor Co to make the synchronously rectified voltage smooth. The tertiary winding n3 and the diode Da construct a circuit for resetting magnetic energy of the transformer Tr.

IC 4 in FIG. 8A is a controller IC (integrated circuit) to drive the MOSFETs Q2 and Q3 for synchronous rectification. The MOSFETs Q2 and Q3 each receives a driving signal from the controller IC IC4, in the time when a forward current flows in the antiparallel-connected diode, and carries an electric current in the direction from the source to drain. The voltage at this time, which is a voltage drop between source and drain of the MOSFET, is lower than the forward voltage drop of the diode, thus reducing the power loss. If the ON signal periods of the MOSFETs Q2 and Q3 are overlapping in the process of transfer from the rectifying to free-wheeling operation or in the process of transfer from the free-wheeling to rectifying operation, the secondary winding of the transformer would be short-circuited to break semiconductor elements. Accordingly, the MOSFETs are driven with a dead time to avoid the overlapping of the ON signal period. A power supply capacitor C1 is connected between a power supply terminal Vcc of the controller IC IC4 and the GND. The capacitor C1 is connected in parallel with the smoothing capacitor Co. Thus, the controller IC IC4 is supplied with DC power from the smoothing capacitor Co.

IC5 in FIG. 8B is a controller IC to drive the MOSFETs Q2 and Q3. The way of operation thereof is the same as the controller IC IC4 in FIG. 8A. A capacitor C1 is connected between a power supply terminal Vcc of the IC5 and the GND. A series-connected circuit of a resistor R3 and a diode D3 is connected between the terminal Vcc and the connection point of one terminal of the secondary winding n2 and the reactor L. Thus, the controller IC IC5 is supplied with power from the secondary winding n2 of the transformer Tr through the resistor R3 and the diode D3.

As described above, the synchronously rectifying semiconductor switch that is an antiparallel-connected circuit of a diode and a MOSFET undergoes an operation mode in which a reverse voltage is applied in the state the diode is carrying a forward current. This mode generates surge voltage due to reverse recovery of the diode. This surge voltage gives the semiconductor element a voltage stress and causes radiation noise and conduction noise. One configuration to address this problem is a snubber circuit parallel-connected to the semiconductor switch. This configuration, however, presents problems of increased number of parts and greater power loss. Thus, there is a need in the art for a DC to DC converter with relatively low power loss, that includes a relatively low number of parts.

SUMMARY OF THE INVENTION

Embodiments of the invention address these and other needs.

Some Embodiments provide a DC to DC converter having a synchronously rectifying circuit with low power loss while restraining the number of parts.

A first aspect of the invention includes a DC to DC converter having a transformer including a primary winding and a secondary winding, the primary winding being ON-OFF driven with a DC power supply and a semiconductor switch in the primary winding side and voltage of the secondary winding being synchronously rectified, the DC to DC converter comprising: an antiparallel-connected circuit of a first diode and a first MOSFET for rectification; a first snubber circuit composed of a reverse-blocking semiconductor switch and a capacitor, the snubber circuit being connected in parallel with the antiparallel-connected circuit; and a controller circuit for controlling the MOSFET, the controller circuit comprising a power supply that is connected to both terminals of the capacitor composing the snubber circuit; wherein the reverse-blocking semiconductor switch is driven either by signals for adjusting a voltage of the capacitor within a permitted range of voltage of the power supply of the controller circuit, or by signals that are determined by a signal obtained from voltage across the MOSFET and by the signals for adjusting a voltage of the capacitor within a permitted range of the power supply of the controller circuit.

A second aspect of the invention includes a DC to DC converter of a forward type having a transformer including a primary winding and a secondary winding, the primary winding being ON-OFF driven with a DC power supply and a semiconductor switch in the primary winding side and voltage of the secondary winding being synchronously rectified, the DC to DC converter comprising: an antiparallel-connected circuit of a diode and a MOSFET for free-wheeling; a snubber circuit composed of a reverse-blocking semiconductor switch and a capacitor, the snubber circuit being connected in parallel with the antiparallel-connected circuit; and a controller circuit for controlling the MOSFET, the controller circuit comprising a power supply that is connected to both terminals of the capacitor composing the snubber circuit; wherein the reverse-blocking semiconductor switch is driven either by signals for adjusting a voltage of the capacitor within a permitted range of voltage of the power supply of the controller circuit, or by signals that are determined by a signal obtained from voltage across the MOSFET and by the signals for adjusting a voltage of the capacitor within a permitted range of the power supply of the controller circuit.

A third aspect of the invention includes a DC to DC converter of a forward type having a transformer including a primary winding and a secondary winding, the primary winding being ON-OFF driven with a DC power supply and a semiconductor switch in the primary winding side and voltage of the secondary winding being synchronously rectified, the DC to DC converter comprising: a first antiparallel-connected circuit of a first diode and a first MOSFET for rectification; a second antiparallel-connected circuit of a second diode and a second MOSFET for free-wheeling, one terminal of the second antiparallel-connected circuit being connected to one terminal of the first antiparallel-connected circuit; a first reverse-blocking semiconductor switch, one terminal of which is connected to the other terminal of the first antiparallel-connected circuit; a second reverse-blocking semiconductor switch, one terminal of which is connected to the other terminal of the second antiparallel-connected circuit; a capacitor connected between a connection point of the other terminal of the first reverse-blocking semiconductor switch and the other terminal of the second reverse-blocking semiconductor switch, and a connection point of the first and second antiparallel-connected circuits, end terminals of the capacitor being connected to end terminals of a power supply of a controller circuit for the first and second MOSFETs; wherein the first and second reverse-blocking semiconductor switches are driven either by signals for adjusting a voltage of the capacitor within a permitted range of voltage of the power supply of the controller circuit, or by signals that are determined by a signal obtained from voltage across the first MOSFET or the second MOSFET and the signals for adjusting a voltage of the capacitor within a permitted range of voltage of the power supply of the controller circuit.

A fourth aspect of the invention includes the DC to DC converter according to any one of the first through third aspects, further comprising a series-connected circuit of a semiconductor switch and a resistor connected in parallel with the capacitor.

A fifth aspect of the invention includes the DC to DC converter according to any one of the first through fourth aspects, further comprising a resistor connected in series with the capacitor or the reverse-blocking semiconductor switch.

A sixth aspect of the invention includes the DC to DC converter according to any one of the first through fifth embodiments, wherein the signal obtained from voltage across the MOSFET is made synchronous with a gate signal for driving the MOSFET.

A seventh aspect of the invention includes the DC to DC converter according to any one of the first through fifth aspects, wherein the signal voltage across the MOSFET is made synchronous with a signal obtained by comparing a level of voltage between drain and source terminals of the MOSFET with a reference value.

An eighth aspect of the invention includes a DC to DC converter of a flyback type having a transformer including a primary winding and a secondary winding, the primary winding being ON-OFF driven with a DC power supply and a semiconductor switch in the primary winding side, and voltage of the secondary winding being synchronously rectified, the DC to DC converter comprising: an antiparallel-connected circuit of a diode and a MOSFET; and a snubber circuit composed of a series-connected circuit of a reverse-blocking semiconductor switch and a capacitor, the snubber circuit being connected in parallel with the MOSFET, and the capacitor being connected to end terminals of a power supply of a controller circuit for the MOSFET, wherein the reverse-blocking semiconductor switch is driven either by signals for adjusting a voltage of the capacitor within a permitted range of voltage of the power supply of the controller circuit, or by signals that are determined by a signal obtained from voltage across the MOSFET and the signals for adjusting a voltage of the capacitor within a permitted range of voltage of the power supply of the controller circuit.

A ninth aspect of the invention includes the DC to DC converter according to the eighth aspect, further comprising a series-connected circuit of a semiconductor switch and a resistor connected in parallel with the capacitor.

A tenth aspect of the invention includes the DC to DC converter according to the eighth or ninth aspect, further comprising a resistor connected in series with the capacitor or the reverse-blocking semiconductor switch.

An eleventh aspect of the invention includes the DC to DC converter according to any one of the eighth through tenth aspects, wherein the signal obtained from voltage across the MOSFET is made synchronous with a gate signal for driving the MOSFET.

A twelfth aspect of the invention includes the DC to DC converter according to any one of the eighth through tenth aspects, wherein the signal obtained from voltage across the MOSFET is made synchronous with a signal obtained by comparing a level of voltage between drain and source terminals of the first or second MOSFET with a reference voltage.

A DC to DC converter certain embodiments includes a circuit comprising a reverse-blocking semiconductor switch to make a synchronously rectifying MOSFET connected in parallel with a capacitor that is connected to the power supply terminal of a conventionally used synchronously rectifying circuit controller IC. The reverse-blocking semiconductor switch is driven by a signal for driving the synchronously rectifying MOSFET or a signal obtained from the voltage across the synchronously rectifying MOSFET, and driven also by a signal to control the voltage across the capacitor connected to the IC power supply in a range between an upper and lower permitted limit of the IC. This construction therefore has a snubber circuit composed of the reverse-blocking semiconductor switch and the capacitor between the both end terminals of the synchronously rectifying MOSFET, suppressing surge voltage. The energy absorbed in the capacitor is supplied as a power supply for the synchronous rectification controller IC and consumed there. The additional parts are the reverse-blocking semiconductor switch and a driving circuit therefor, which can be contained in the controller IC, achieving a small-sized converter.

DETAILED DESCRIPTION

Embodiments of the invention include a snubber circuit composed of a reverse-blocking semiconductor switch and a capacitor is connected between the end terminals of a synchronously rectifying semiconductor switch composed of an antiparallel-connected diode and a MOSFET. In this construction, the signal to drive the reverse-blocking semiconductor switch is composed of a signal for driving the synchronously rectifying semiconductor switch, which is a MOSFET, or a signal obtained from the voltage between the end terminals of the MOSFET, and of a signal for controlling the voltage across the capacitor within a permitted range of the power supply of the IC.

First Embodiment

Figure 1:
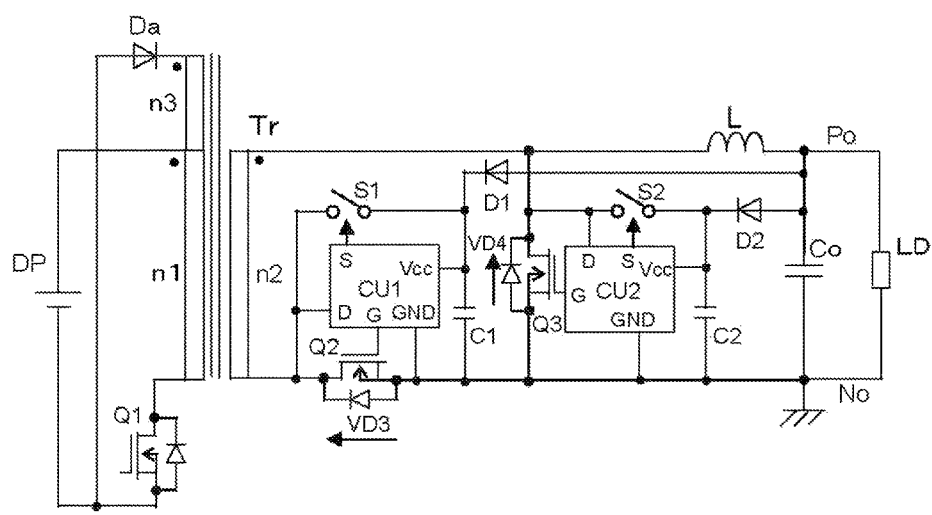
FIG. 1 is a circuit diagram of a DC to DC converter of a first embodiment according to the invention.

FIG. 1 shows a DC to DC converter of a first embodiment according to the invention. This converter of the first embodiment comprises a forward type DC to DC conversion circuit that includes a synchronously rectifying semiconductor switch for rectification and a synchronously rectifying semiconductor switch for free-wheeling. The converter of the first embodiment shown in FIG. 1 comprises a transformer Tr, a MOSFET Q2, a MOSFET Q3, a reactor L, and a smoothing capacitor Co. The primary winding n1 of the transformer Tr is driven by a DC power supply DP and a semiconductor switch, a MOSFET Q1. The magnetic energy stored in the transformer Tr during the ON period of the MOSFET Q1 is reset during the OFF period of the MOSFET Q1 with a tertiary winding n3 and a diode Da. One terminal of the secondary winding n2 of the transformer Tr is connected to one terminal of the reactor L; the other terminal of the secondary winding n2 is connected to the drain terminal of the MOSFET Q2 for rectification (a first MOSFET) with an antiparallel-connected diode (a first diode). Between the one terminal of the reactor L and the source terminal of the MOSFET Q2 connected is a MOSFET Q3 for free-wheeling (a second MOSFET) with an antiparallel-connected diode (a second diode); between the other terminal of the reactor L and the source terminal of the MOSFET Q2 connected is a parallel-connected circuit of the smoothing capacitor Co and a load LD.

To the end terminals of the rectifying MOSFET Q2 connected is a series-connected circuit (a snubber circuit) of a reverse-blocking semiconductor switch S1 and a capacitor C1; to the end terminals of the free-wheeling MOSFET Q3 connected is a series-connected circuit (a snubber circuit) of a reverse-blocking semiconductor switch S2 and a capacitor C2. A diode D1 is connected between the connection point of the reverse-blocking semiconductor switch S1 and the capacitor C1 and the positive terminal Po of the capacitor Co; a diode D2 is connected between the connection point of the reverse-blocking semiconductor switch S2 and the capacitor C2 and the positive terminal Po of the capacitor Co. The diodes D1 and D2 are provided according to the magnitude of output voltage or may not be provided. The capacitor C1 is connected to the power supply terminal Vcc and GND of a controlling and driving unit CU1 for driving the MOSFET Q2 and the reverse-blocking semiconductor switch S1; the capacitor C2 is connected to the power supply terminal Vcc and GND of a controlling and driving unit CU2 for driving the MOSFET Q3 and the reverse-blocking semiconductor switch S2. When the turning OFF operation is very fast for the MOSFETs Q2 and Q3 each having the antiparallel-connected diode D3 or D4, resistors can be connected in series to the series-connected circuit of the reverse-blocking semiconductor switch S1 and the capacitor C1 and to the series-connected circuit of the reverse-blocking semiconductor switch S2 and the capacitor C2, to suppress rush current flow into the capacitors.

Figure 2A:
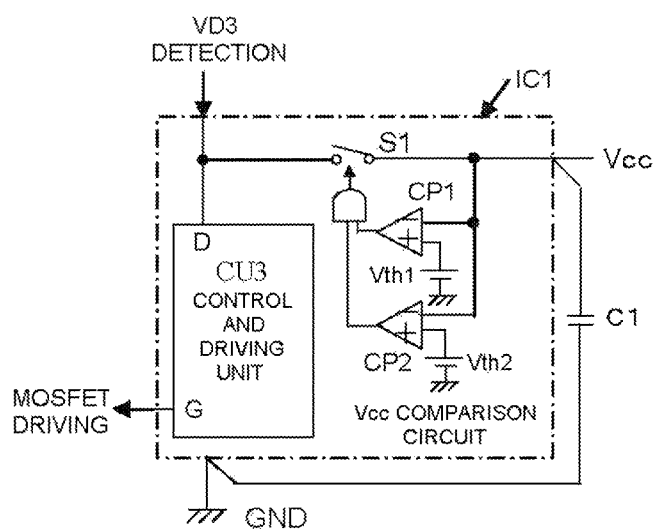
FIGS. 2A and 2B illustrate a first operation mode for controlling the DC to DC converter of FIG. 1.
Figure 2B:
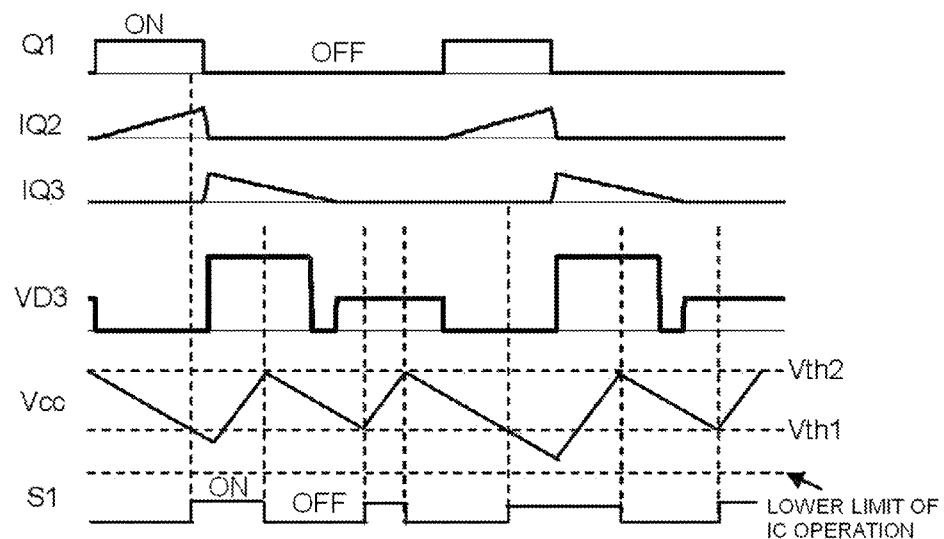

Operation of this construction of circuit is described below with reference to FIGS. 2A, 2B and 3A, 3B. The following describes only about the operation of the reverse-blocking semiconductor switch S1 because the operation is the same for the S1 and S2. FIGS. 2A and 2B show a first example in which the voltage of the capacitor C1 in the circuit construction of FIG. 1 is controlled within a permitted range, wherein FIG. 2A shows a detailed circuit diagram and FIG. 2B shows operation waveforms. The controlling and driving unit CU1 shown in FIG. 1 comprises, as shown in FIG. 2A, a controlling and driving unit CU3, a comparator CP2 that detects the upper permitted value Vth2 for the voltage Vcc of the capacitor C1, and a comparator CP1 that detects a voltage Vth1 higher than the lower permitted voltage. When the voltage Vcc of the capacitor C1 decreases below the Vth1, the reverse-blocking semiconductor switch S1 turns ON. When a voltage VD3 is applied between the terminals of the synchronously rectifying MOSFET Q2, the capacitor C1 is charged, increasing the voltage Vcc. When the voltage Vcc reaches the upper permitted voltage Vth2, the reverse-blocking semiconductor switch S1 turns OFF. After that, the voltage Vcc decreases.

Repeating the process, the controller IC IC1 performs driving operation at an approximately constant voltage of Vcc. If the voltage VD3 is not given to the synchronously rectifying MOSFET Q2 after the voltage Vcc has decreased below the voltage Vth1, the voltage Vcc continues to decrease until it reaches a lower limit operation voltage of the controller IC1. In this case, the controller IC1 ceases operation until the voltage Vcc returns to a value equal to or higher than the lower limit operation voltage of the IC1.

Figure 3A:
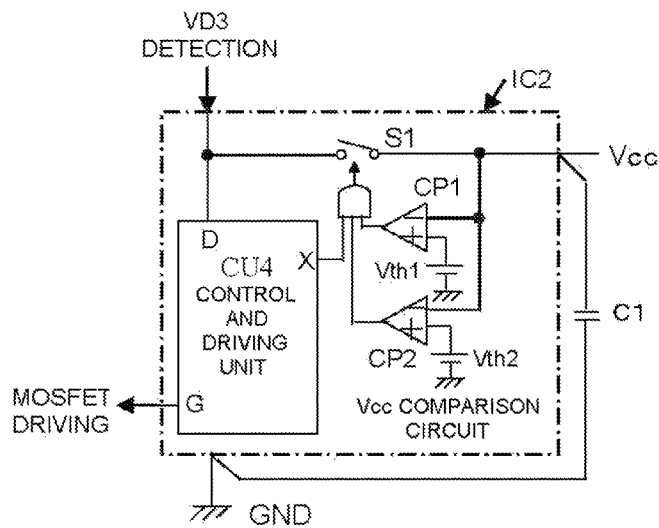
FIGS. 3A and 3B illustrate a second operation mode for controlling the DC to DC converter of FIG. 1.
Figure 3B:
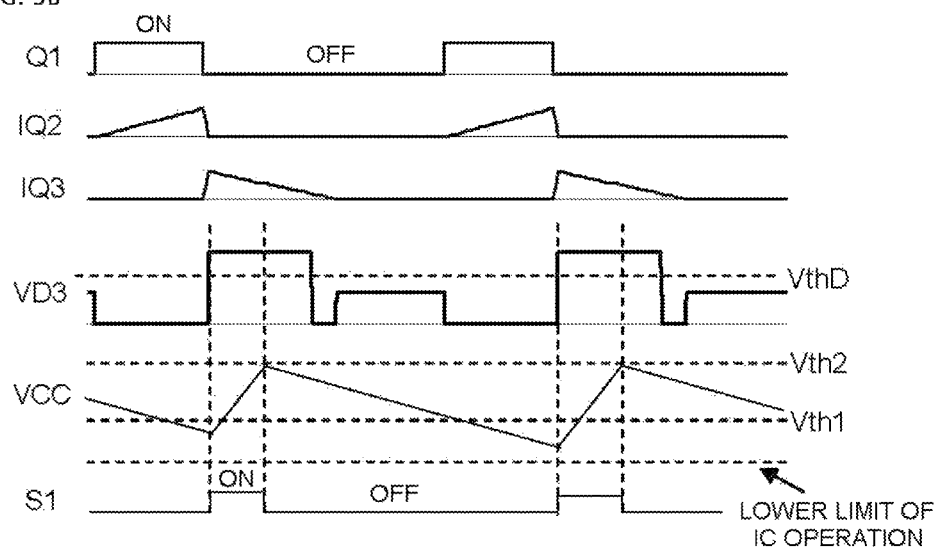

FIGS. 3A and 3B show a second example in which the voltage of the capacitor C1 in the circuit construction of FIG. 1 is controlled within a permitted range, wherein FIG. 3A shows a detailed circuit diagram and FIG. 3B shows operation waveforms. This example differs from the example of FIG. 2 in that the timing of turning the reverse-blocking semiconductor switch S1 ON is synchronized with the timing of applying the voltage VD3 to the terminals of the synchronously rectifying MOSFET Q2. "VthD" indicated in FIG. 3B is a threshold value to confirm that the voltage VD3 between the terminals of the MOSFET Q2 is sufficiently higher than the Vcc voltage, and the VthD is set in a controlling and driving unit CU4. This example does not need the threshold value Vth1. This example performs the same effects as the example of FIG. 2.

Second Embodiment

Figure 4:
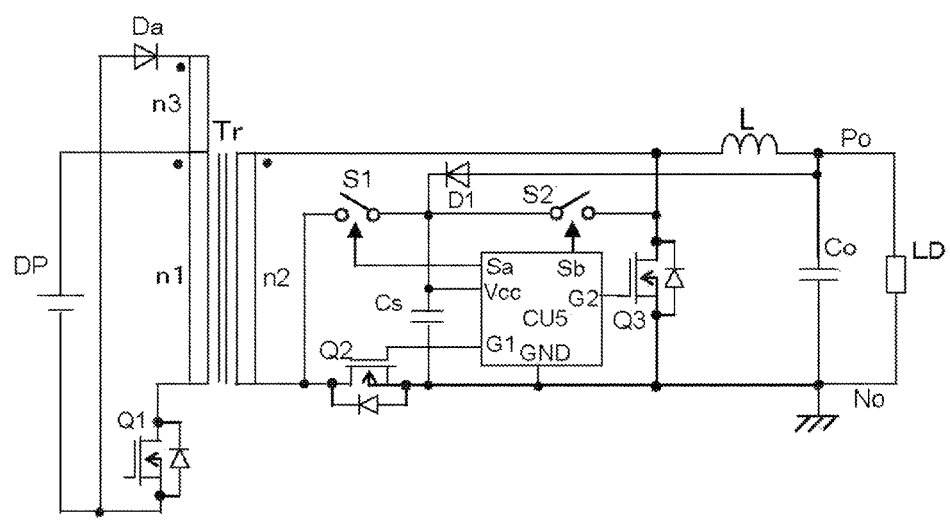
FIG. 4 is a circuit diagram of a DC to DC converter of a second embodiment according to the invention.

FIG. 4 shows a DC to DC converter of a second embodiment according to the invention. In the converter of the first embodiment described above, each of the MOSFET Q2 for rectification and the MOSFET Q3 for free-wheeling is connected to a snubber circuit composed of series-connected reverse-blocking semiconductor switch and a capacitor. In this second embodiment, however, a single capacitor Cs is used in common in both the snubber circuits. And only one controlling and driving unit CU5 is provided. A series-connected circuit of a reverse-blocking semiconductor switch S1 and the capacitor Cs is connected to the drain terminal and the source terminal of the rectifying MOSFET Q2. A reverse-blocking semiconductor switch S2 is connected between the drain terminal of a free-wheeling MOSFET Q3 and the connection point between the reverse-blocking semiconductor switch S1 and the capacitor Cs. A diode D1 is connected between the connection point between the reverse-blocking semiconductor switch S1 and the capacitor Cs and the positive terminal Po of the smoothing capacitor Co in the DC output circuit. This diode D1 is provided according to circuit conditions such as a magnitude of an output voltage and can be omitted. When the turn OFF operation is very fast for the MOSFETs Q2 and Q3 each having the antiparallel-connected diode D3 or D4, a resistor(s) can be connected in series to the reverse-blocking semiconductor switches S1 and S2 or to the capacitor Cs, to suppress rush current flow into the capacitor Cs.

The operation of the reverse-blocking semiconductor switches S1 and S2 can be the same as that in the first embodiment. The number of parts, however, can be reduced because only one capacitor Cs is needed. The capacitance of the capacitor can be small because the capacitor is charged twice in one period: at the OFF time of the rectifying MOSFET Q2 and the OFF time of the free-wheeling MOSFET Q3.

Third Embodiment

Figure 5:
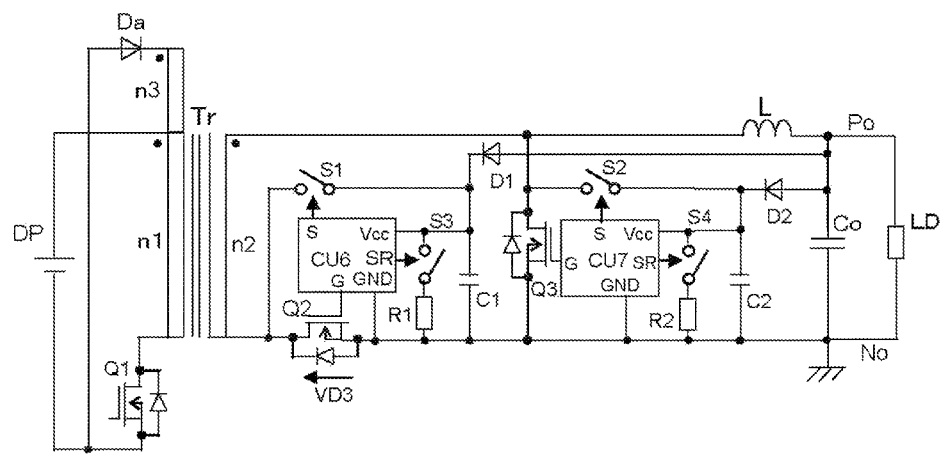
FIG. 5 is a circuit diagram of a DC to DC converter of the third embodiment according to the invention.
Figure 6A:
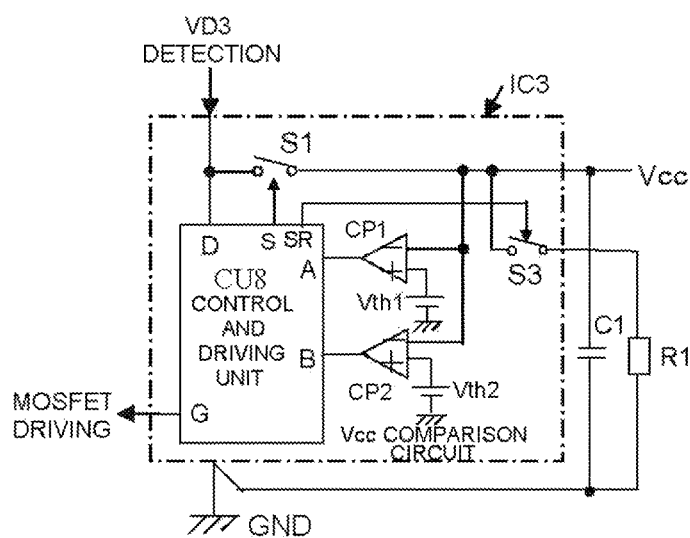
FIGS. 6A and 6B illustrate operation for controlling the DC to DC converter of FIG. 5.
Figure 6B:
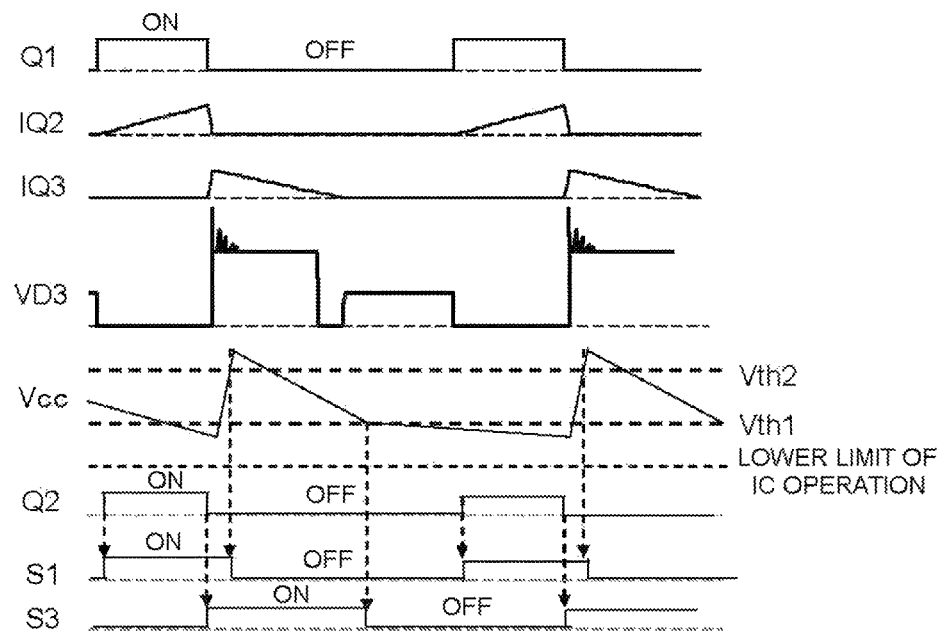

FIG. 5 shows a DC to DC converter of a third embodiment according to the invention. This converter comprises, in addition to the circuit construction of the first embodiment of FIG. 1, a series-connected circuit of a semiconductor switch S3 and a resistor R1 provided in parallel with the capacitor C1 and a series-connected circuit of a semiconductor switch S4 and a resistor R2 provided in parallel with the capacitor C2. This featured additional structure can be used in the converter of the second embodiment and the converter of the fourth embodiment, which will be described later. FIGS. 6A and 6B illustrate control operation of the converter of FIG. 5, in which FIG. 6A is a detailed circuit diagram of a part of the converter and FIG. 6B shows operational waveforms. The operation about the semiconductor switch S3 is solely described in the following because the operation about the semiconductor switch S4 is same as that of the switch S3.

On the voltage VD3 across the rectifying MOSFET Q2, surge voltage occurs at the time of turning OFF corresponding to the magnitude of the load LD and circuit parameters such as parasitic capacitance and inductance. In the converters of the first and second embodiments, solely the controller IC consumes the energy in the capacitor C1 in the OFF period of the reverse-blocking semiconductor switch S1. If the power consumption in the IC is relatively small with respect to the energy stored in the capacitor C1, the voltage across the capacitor C1 decreases slowly. As a result, the reverse-blocking semiconductor switch S1 does not always turn ON at every switching cycle. Therefore, the capacitor C1 is hardly used for surge absorption of the rectifying MOSFET Q2 at the time of turning OFF.

This problem is solved by the converter of the third embodiment. As shown in FIG. 6A, a series-connected circuit of the semiconductor switch S3 and the resistor R1 is connected in parallel with the capacitor C1. In the controller IC IC3, the reverse-blocking semiconductor switch S1 for charging is turned ON at the timing of turning ON of the rectifying MOSFET Q2. Since the rectifying MOSFET Q2 is turned OFF before the current in the rectifying MOSFET Q2 decreases to zero, the semiconductor switch S3 for discharging is turned ON synchronously with the OFF timing of the rectifying MOSFET Q2. When the current in the rectifying MOSFET Q2 becomes zero, the voltage VD3 across the rectifying MOSFET Q2 has a waveform containing surge voltages. The capacitor C1 is charged with this voltage waveform and excessive energy is consumed in the resistor R1. When the voltage Vcc of the capacitor C1 reaches the threshold value Vth2, the reverse-blocking semiconductor switch S1 is turned OFF to prevent the voltage Vcc from growing to an overvoltage. At this time, the semiconductor switch S3 remains in the ON state until the voltage Vcc decreases to the threshold value Vth1. After that, the voltage Vcc of the capacitor C1 decreases gradually due to the power consumption in the controller IC IC3. ON-OFF timing of the rectifying MOSFET Q2 can be controlled by either of the two modes in the description about the first embodiment with reference to FIGS. 2A and 2B.

Fourth Embodiment

Figure 7:
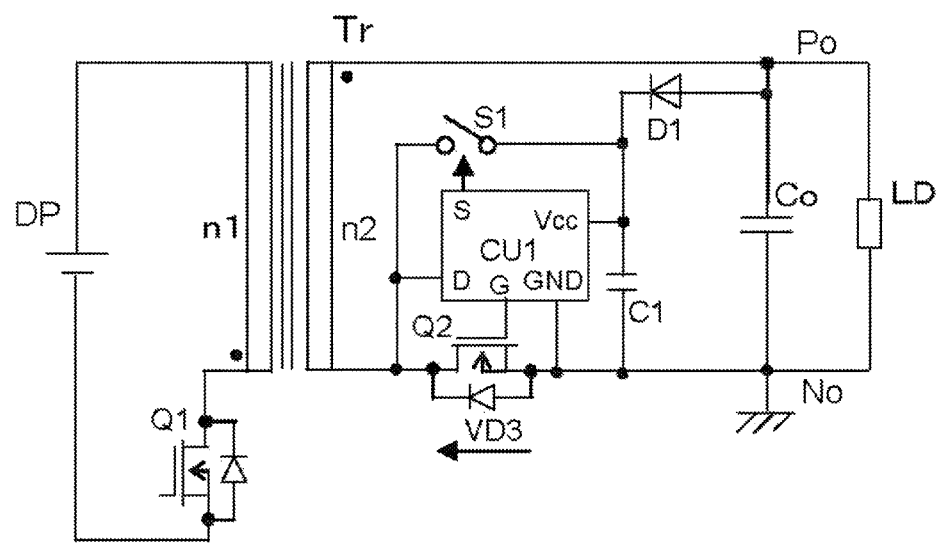
FIG. 7 is a circuit diagram of a DC to DC converter of a fourth embodiment according to the invention.
Figure 8A:
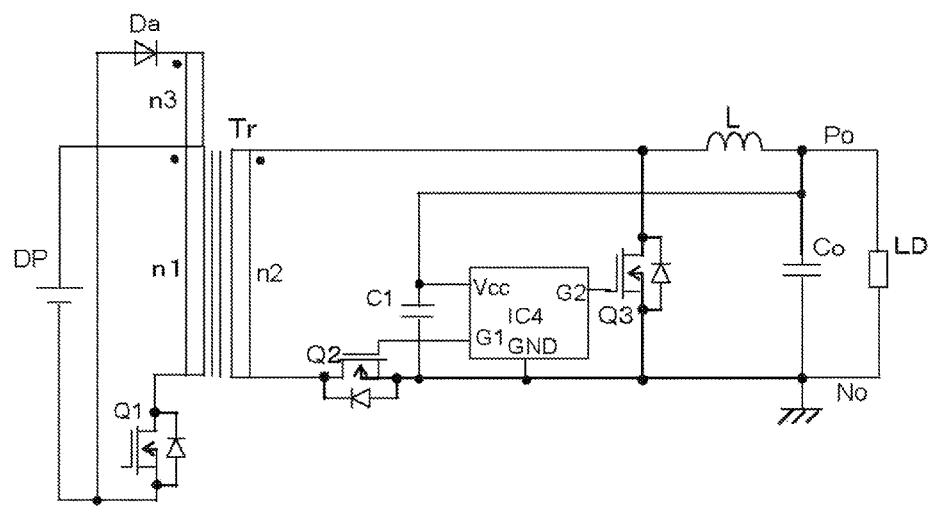
FIGS. 8A and 8B are circuit diagrams of conventional DC to DC converters.
Figure 8B:
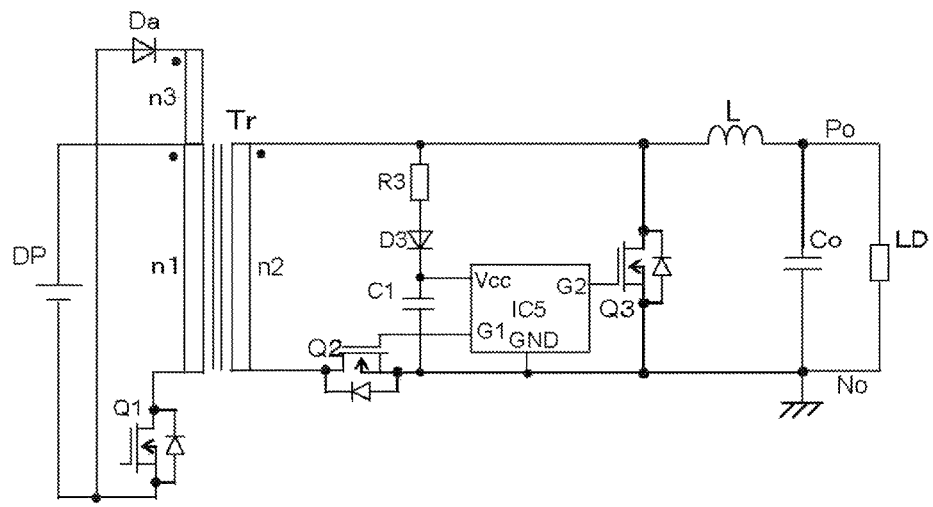

FIG. 7 shows a DC to DC converter of a fourth embodiment according to the invention. This converter is composed of a flyback type DC to DC converter circuit including a synchronously rectifying MOSFET Q2. When the primary winding n1 of the transformer Tr is driven with a DC power supply DP and a MOSFET Q1, magnetic energy is stored in the transformer, and when the MOSFET Q1 is turned OFF, the energy is transferred in the path: a secondary winding n2→a parallel circuit of a capacitor Co and a load LD→MOSFET Q2, supplying the load LD with electric power. As in the DC to DC converters of the other embodiments, a series-connected circuit of a reverse-blocking semiconductor switch S1 and a capacitor C1 is connected to the end terminals of the MOSFET Q2, and the capacitor C1 is connected to the power supply of a controlling and driving unit CU1. Operation of the converter with this construction is the same as those in embodiments 1 through 3. Like the converter of the third embodiment, the converter of the fourth embodiment can also include a series-connected circuit of a semiconductor switch S3 and a resistor R1 in parallel with the capacitor C1.

The synchronously rectifying semiconductor switches in the descriptions thus far are MOSFETs (Q2 and Q3) with an antiparallel-connected diode. For the diode, however, a parasitic diode of the MOSFET can be utilized.

Embodiments of the invention can be applied to switching regulators and DC power supply systems that use a synchronously rectifying circuit, and to controller ICs for controlling these power supplies.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2011-234700, filed on Oct. 26, 2011. The disclosure of the priority application, in its entirety, including the drawings, claims, and the specification thereof, is incorporated herein by reference.

What is claimed is:

1. A DC to DC converter having a transformer including a primary winding and a secondary winding, the primary winding being ON-OFF driven with a DC power supply and a semiconductor switch in the primary winding side and voltage of the secondary winding being synchronously rectified, the DC to DC converter comprising:
   an antiparallel-connected circuit of a diode and a MOSFET for rectification;
   a snubber circuit composed of a reverse-blocking semiconductor switch and a capacitor, the snubber circuit being connected in parallel with the antiparallel-connected circuit; and
   a controller circuit for controlling the MOSFET, the controller circuit comprising a power supply that is connected to both terminals of the capacitor composing the snubber circuit;
   wherein the reverse-blocking semiconductor switch is driven either
      by signals for adjusting a voltage of the capacitor within a permitted range of voltage of the power supply of the controller circuit, or by signals that are determined by a signal obtained from voltage across the MOSFET and by the signals for adjusting a voltage of the capacitor within a permitted range of the power supply of the controller circuit.

2. The DC to DC converter according to claim 1, further comprising a series-connected circuit of a semiconductor switch and a resistor connected in parallel with the capacitor.

3. The DC to DC converter according to claim 1, further comprising a resistor connected in series with the capacitor or the reverse-blocking semiconductor switch.

4. The DC to DC converter according to claim 1,
wherein the signal obtained from voltage across the MOSFET is made synchronous with a gate signal for driving the MOSFET.

5. The DC to DC converter according to claim 1,
wherein the signal obtained from voltage across the MOSFET is made synchronous with a signal obtained by comparing a level of voltage between drain and source terminals of the MOSFET with a reference value.

6. The DC to DC converter according to claim 1,
wherein the signal obtained from voltage across the MOSFET is made synchronous with a signal obtained by comparing a level of voltage between drain and source terminals of the MOSFET with a reference value.

7. A DC to DC converter of a forward type having a transformer including a primary winding and a secondary winding, the primary winding being ON-OFF driven with a DC power supply and a semiconductor switch in the primary winding side and voltage of the secondary winding being synchronously rectified,
the DC to DC converter comprising:
an antiparallel-connected circuit of a diode and a MOSFET for free-wheeling;
a snubber circuit composed of a reverse-blocking semiconductor switch and a capacitor, the snubber circuit being connected in parallel with the antiparallel-connected circuit; and
a controller circuit for controlling the MOSFET, the controller circuit comprising a power supply that is connected to both terminals of the capacitor composing the snubber circuit;
wherein the reverse-blocking semiconductor switch is driven either
by signals for adjusting a voltage of the capacitor within a permitted range of voltage of the power supply of the controller circuit, or
by signals that are determined by a signal obtained from voltage across the MOSFET and by the signals for adjusting a voltage of the capacitor within a permitted range of the power supply of the controller circuit.

8. The DC to DC converter according to claim 7, further comprising a series-connected circuit of a semiconductor switch and a resistor connected in parallel with the capacitor.

9. The DC to DC converter according to claim 7, further comprising a resistor connected in series with the capacitor or the reverse-blocking semiconductor switch.

10. The DC to DC converter according to claim 7,
wherein the signal obtained from voltage across the MOSFET is made synchronous with a gate signal for driving the MOSFET.

11. The DC to DC converter according to claim 7,
wherein the signal obtained from voltage across the MOSFET is made synchronous with a signal obtained by comparing a level of voltage between drain and source terminals of the MOSFET with a reference value.

12. A DC to DC converter of a forward type having a transformer including a primary winding and a secondary winding, the primary winding being ON-OFF driven with a DC power supply and a semiconductor switch in the primary winding side and voltage of the secondary winding being synchronously rectified,
the DC to DC converter comprising:
a first antiparallel-connected circuit of a first diode and a first MOSFET for rectification;
a second antiparallel-connected circuit of a second diode and a second MOSFET for free-wheeling, one terminal of the second antiparallel-connected circuit being connected to one terminal of the first antiparallel-connected circuit;
a first reverse-blocking semiconductor switch, one terminal of which is connected to the other terminal of the first antiparallel-connected circuit;
a second reverse-blocking semiconductor switch, one terminal of which is connected to the other terminal of the second antiparallel-connected circuit;
a capacitor connected between a connection point of the other terminal of the first reverse-blocking semiconductor switch and the other terminal of the second reverse-blocking semiconductor switch, and a connection point of the first and second antiparallel-connected circuits, end terminals of the capacitor being connected to end terminals of a power supply of a controller circuit for the first and second MOSFETs;
wherein the first and second reverse-blocking semiconductor switches are driven either
by signals for adjusting a voltage of the capacitor within a permitted range of voltage of the power supply of the controller circuit, or
by signals that are determined by a signal obtained from voltage across the first MOSFET or the second MOSFET and the signals for adjusting a voltage of the capacitor within a permitted range of voltage of the power supply of the controller circuit.

13. The DC to DC converter according to claim 12, further comprising a series-connected circuit of a semiconductor switch and a resistor connected in parallel with the capacitor.

14. The DC to DC converter according to claim 12, further comprising a resistor connected in series with the capacitor or the reverse-blocking semiconductor switch.

15. The DC to DC converter according to claim 12,
wherein the signal obtained from voltage across the MOSFET is made synchronous with a gate signal for driving the MOSFET.

16. A DC to DC converter of a flyback type having a transformer including a primary winding and a secondary winding, the primary winding being ON-OFF driven with a DC power supply and a semiconductor switch in the primary winding side, and voltage of the secondary winding being synchronously rectified, the DC to DC converter comprising:
an antiparallel-connected circuit of a diode and a MOSFET; and
a snubber circuit composed of a series-connected circuit of a reverse-blocking semiconductor switch and a capacitor, the snubber circuit being connected in parallel with the MOSFET, and the capacitor being connected to end terminals of a power supply of a controller circuit for the MOSFET,
wherein the reverse-blocking semiconductor switch is driven either
by signals for adjusting a voltage of the capacitor within a permitted range of voltage of the power supply of the controller circuit, or
by signals that are determined by a signal obtained from voltage across the MOSFET and the signals for adjusting a voltage of the capacitor within a permitted range of voltage of the power supply of the controller circuit.

17. The DC to DC converter according to claim 16, further comprising a series-connected circuit of a semiconductor switch and a resistor connected in parallel with the capacitor.

18. The DC to DC converter according to claim 16, further comprising a resistor connected in series with the capacitor or the reverse-blocking semiconductor switch.

19. The DC to DC converter according to claim 16,
wherein the signal obtained from voltage across the MOSFET is made synchronous with a gate signal for driving the MOSFET.

20. The DC to DC converter according to claim 16,
wherein the signal obtained from voltage across the MOSFET is made synchronous with a signal obtained by comparing a level of voltage between drain and source terminals of the MOSFET with a reference voltage.

\* \* \* \* \*